(12) United States Patent
Autio et al.

(10) Patent No.: US 10,023,803 B2
(45) Date of Patent: Jul. 17, 2018

(54) METHOD FOR PERFORMING PYROLYSIS AND A PYROLYSIS APPARATUS

(71) Applicant: Valmet Technologies Oy, Espoo (FI)

(72) Inventors: Joakim Autio, Kangasala (FI); Timo Honkola, Ruutana (FI)

(73) Assignee: Valmet Technologies, Inc., Espoo (FI)

( * ) Notice: Subject to any disclaimer, the term of this patent is extended or adjusted under 35 U.S.C. 154(b) by 434 days.

(21) Appl. No.: 14/441,812

(22) PCT Filed: Nov. 7, 2013

(86) PCT No.: PCT/FI2013/051055
§ 371 (c)(1),
(2) Date: May 8, 2015

(87) PCT Pub. No.: WO2014/072583
PCT Pub. Date: May 15, 2014

(65) Prior Publication Data
US 2015/0315474 A1 Nov. 5, 2015

(30) Foreign Application Priority Data

Nov. 9, 2012 (FI) ..................................... 20126178

(51) Int. Cl.
*C10B 49/22* (2006.01)
*C10B 53/02* (2006.01)
(Continued)

(52) U.S. Cl.
CPC .............. *C10B 49/22* (2013.01); *C04B 2/108* (2013.01); *C04B 7/4446* (2013.01); *C10B 53/02* (2013.01);
(Continued)

(58) Field of Classification Search
CPC combination set(s) only.
See application file for complete search history.

(56) References Cited

U.S. PATENT DOCUMENTS 4,039,392 A 8/1977 Singh
4,891,459 A 1/1990 Knight et al.
(Continued)

FOREIGN PATENT DOCUMENTS

CN 102191088 A 9/2011
CN 102504842 6/2012
(Continued)

OTHER PUBLICATIONS

E. Kiiskilae: "Biomass Gasification in an Ahlstroem Pyroflow Gasifier Replaces Oil in Lime Kilns", Biomassan Uusia Jalostusmahdollisuuksia, 1990-Luvulla: [VTT Symposium], Espoo, FI, vol. 75, Jan. 1, 1987, pp. 76-89, XPOO8135249, ISBN: 951-38-2816-6, figures 5 and 6, table 3.
(Continued)

*Primary Examiner* — Brian R Gordon
(74) *Attorney, Agent, or Firm* — Stiennon & Stiennon

(57) ABSTRACT

Solid fuel in the form of particles is supplied to a pyrolyzer, and pyrolysis conditions are maintained in the pyrolyzer for separating condensable gaseous substances from the fuel. Heat required by the pyrolysis conditions is supplied at least partly with solid fluidized bed material which passes through the pyrolyzer simultaneously as it is fluidized by fluidizing gas in the pyrolyzer. Condensable gaseous substances separated from the fuel are conveyed from the pyrolyzer to a condenser, in which they are separated as so-called pyrolysis oil in liquid form, and solid fluidized bed material taken from the pyrolyzer and containing combustible pyrolysis residue originating from the fuel is circulated through a gasifier, in which product gas, which is burnt in a boiler or a kiln, is formed from the pyrolysis residue.

4 Claims, 1 Drawing Sheet

(51) Int. Cl.
*C04B 2/10* (2006.01)
*C04B 7/44* (2006.01)
*C10J 3/62* (2006.01)
*C10J 3/46* (2006.01)

(52) U.S. Cl.
CPC ............ *C10J 3/62* (2013.01); *C10J 3/463* (2013.01); *C10J 2300/094* (2013.01); *C10J 2300/0956* (2013.01); *C10J 2300/0993* (2013.01); *C10J 2300/1606* (2013.01); *C10J 2300/1687* (2013.01); *C10J 2300/1807* (2013.01); *Y02E 50/14* (2013.01)

(56) References Cited

U.S. PATENT DOCUMENTS

| | | | |
|---|---|---|---|
| 5,728,271 | A | 3/1998 | Piskorz et al. |
| 6,814,940 | B1 | 11/2004 | Hiltunen et al. |
| 8,287,697 | B2 | 10/2012 | Honkola et al. |
| 8,500,959 | B2* | 8/2013 | Lehto ............ C10B 49/22 201/12 |
| 9,464,245 | B2* | 10/2016 | Gao ............ C10B 49/10 |
| 2009/0242376 | A1 | 10/2009 | Lehto |
| 2009/0242377 | A1 | 10/2009 | Honkola et al. |
| 2010/0266464 | A1* | 10/2010 | Sipila ............ C10B 49/10 422/187 |
| 2013/0239479 | A1* | 9/2013 | Gao ............ C10B 49/10 48/89 |

FOREIGN PATENT DOCUMENTS

| | | |
|---|---|---|
| EP | 0513051 | 8/1991 |
| FI | 117512 | 11/2006 |
| JP | 2006159096 A | 6/2006 |
| WO | 9424228 | 10/1994 |
| WO | 9706886 A1 | 2/1997 |
| WO | 0006671 A1 | 2/2000 |
| WO | 0168789 A1 | 9/2001 |
| WO | 02083816 A1 | 10/2002 |
| WO | 03106590 A1 | 12/2003 |
| WO | 2014072583 A1 | 5/2014 |

OTHER PUBLICATIONS

International Search Report for PCT/FI2013/051055 dated Feb. 25, 2014.
Written Opinion of the International Searching Authority for PCT/FI2013/051055 dated Feb. 25, 2014.

* cited by examiner

METHOD FOR PERFORMING PYROLYSIS AND A PYROLYSIS APPARATUS

CROSS REFERENCES TO RELATED APPLICATIONS

This application is a U.S. national stage application of international App. No. PCT/FI2013/051055 filed Nov. 7, 2013, and claims priority on Finnish Application No. 20126178, filed Nov. 9, 2012, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for performing pyrolysis, wherein solid fuel in the form of particles is supplied to a pyrolyzer, and pyrolysis conditions are maintained in the pyrolyzer in order to separate condensable gaseous substances from the fuel. The invention further relates to a pyrolysis apparatus.

Pyrolysis refers to the conversion of fuel under inert conditions and at a high temperature to gaseous form, which during condensation forms oily liquid that comprises different organic compounds. In connection with pyrolysis, inert conditions refer to oxygen-free conditions, wherein combustion of fuel is avoided. Tar distillation is one example of a pyrolysis process known for ages.

In the pyrolysis process, the fuel is pyrolyzed, the gaseous compounds formed in the reaction are separated from carbonization residue, and they are condensed into pyrolysis oil which may be used, for example, as fuel, or it may be processed further into different chemicals. Production of pyrolysis oil from different bio-based, for example wood-based fuels has been studied with the purpose of replacing coal and heavy fuel oil with it. One advantage of pyrolysis oil is its easy transportation in comparison to biomass that is difficult to transport, when the energy content of fuels are taken into account.

Examples on the development of pyrolysis processes include many patent publications, such as U.S. Pat. No. 4,891,459, U.S. Pat. No. 5,728,271, EP 513051, U.S. Pat. No. 6,814,940, WO 97/06886, WO 02/083816, and WO 03/106590.

A particular set is formed by publications, in which a pyrolyzer is placed in connection with a fluidized bed boiler that burns fuel, as presented e.g. in patent FI 117512 as well as patents FI 122858 and FI 122778 and the corresponding US application publications US 20090242376 ja US 20090242377. In these, the energy content of hot inert bed material (sand) taken from the fluidized bed boiler is utilized for performing endothermic pyrolysis. The bed material which has released the required heat in the pyrolysis in the pyrolyzer is returned to the furnace of the fluidized bed boiler. At the same time, residual carbon (coke) from the pyrolysis process, i.e. pyrolyzed fuel residue, is carried with the bed material to the furnace where it burns, whereby it partly replaces the fuel of the boiler. Non-condensable gases formed in the pyrolysis process can also be conveyed to the furnace for combustion. The boiler can be a circulating fluidized bed boiler (CFB) or a bubbling fluidized bed boiler (BFB).

Pyrolysis integrated in a fluidized bed boiler provides advantages in the process technology, but a disadvantage is that it may be difficult to find a suitable location for the pyrolyzer in the cramped boiler environment. That is to say, the pyrolyzer has to be close to the boiler so that the bed material does not cool too much during the passage between the boiler and the pyrolyzer. Furthermore, the pyrolysis process is dependent on the load of the boiler. Moreover, the use of a boiler operating on the principle of a bubbling fluidized bed (BFB) in combination with a pyrolyzer is hampered because residual carbon from the pyrolysis process may fly with fluidizing air out of the bed, whereby the energy contained in it is wasted.

SUMMARY OF THE INVENTION

It is an aim of the invention to provide a pyrolysis method which is not dependent on the fluidized bed boiler or combustion boilers in general. To achieve this aim, the method is primarily characterized in that the solid material passing through the pyrolysis process is taken from the fuel gasification process which releases heat to the material, and it is returned to the gasification process in which the residual carbon from the pyrolysis process is gasified. A circulation of solid material that transfers heat is thus arranged between the pyrolyzer and the gasifier. Heat generated in the gasification is transferred to the material which releases it to the pyrolysis process. The residual carbon formed in the pyrolysis process, in turn, is very suitable as fuel for the gasification process. When the residual carbon is gasified, product gas is obtained which can be burnt in a suitable plant, for example a boiler or a kiln, and heat is also obtained which is transferred to the solid material and with the solid material to the pyrolysis process again. The kiln can be, for example, a cement kiln or a lime mud reburning kiln.

The pyrolysis process is not dependent on the boiler. Furthermore, the residual carbon produced by the pyrolysis process is almost absolutely dry, which is advantageous in the gasification.

Advantageously all or most of the fuel used in the gasification is residual carbon from the pyrolysis process. If necessary, fuel can also be taken from elsewhere to the gasification process.

The fuel to be pyrolyzed can be used indirectly as the source of energy for the whole combustion plant. Pyrolysis oil and non-condensable gases are separated from the fuel in the pyrolysis process, and the pyrolysis residue i.e. the carbonization residue (coke) is lead into a gasification process, where product gas is obtained from it and used as fuel for energy production in the boiler or, for example, as a heat source in a kiln, such as a cement kiln or a lime mud reburning kiln. Also, the non-condensable gases obtained from the pyrolysis process can be burnt in the same place. The combustion can be performed by simple burner combustion. The pyrolysis process does not determine the structure of the boiler, and the pyrolyzer does not need to be placed close to the boiler or furnace. What is essential in the boiler is that it comprises a heat circuit which is capable of receiving the heat produced by combustion for energy production. In the boiler, side effects (asymmetric load, dust emissions, effect of hot/cold zones in the bed on fouling, etc.) are eliminated or significantly reduced when gas combustion can be used instead of fluidized bed combustion. Similarly, it is possible to use any kiln which is intended to be heated by combustion of gas.

From the gasification process, product gas can also be conveyed to several targets.

As fuel for pyrolysis, a variety of solid material is useful, particularly biomass of plant origin in a suitably small particle size.

The apparatus no longer involves problems caused by the layout, because the location of the pyrolyzer is not dependent on the location of the place of combustion. The only factor determining the location of the pyrolyzer is the location of the fuel gasifier. The gasifier and the pyrolyzer are placed close to each other, but the actual place of combustion of the product gas (the boiler and/or the kin) can be located at a distance many times farther away, for example more than 10 times farther away than the distance between the pyrolyzer and the gasifier, when measured, for example, along the transfer duct for heated bed material and along the product gas duct, respectively. The gasifier and the pyrolyzer can also be easily integrated, if they are both thermally insulated (brick-laid) reactors. The pyrolyzer and the gasifier are placed, for example, in the same power plant as the boiler, but they can be located more freely with respect to the boiler. The pyrolyzer and the gasifier can also be placed in the same processing plant where the kiln for burning product gas is in use.

BRIEF DESCRIPTION OF THE DRAWINGS

In the following, the invention will be described in more detail with reference to the appended drawings.

DESCRIPTION OF THE PREFERRED EMBODIMENTS

Figure 1:
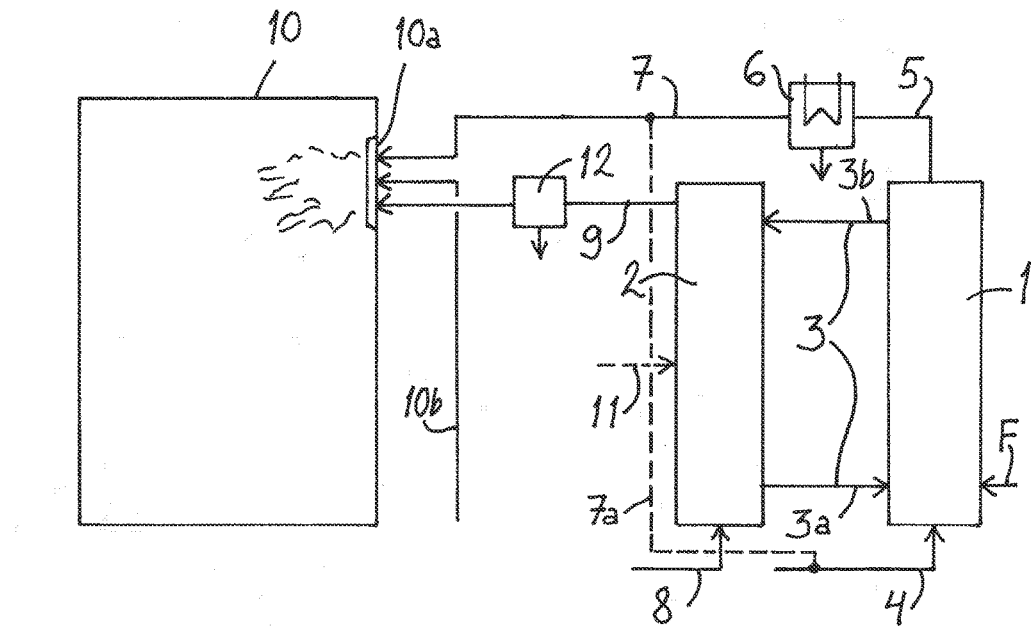
FIG. 1 is a schematic view of an apparatus applying the pyrolysis process according to the invention.

In FIG. 1, the apparatus is shown in a schematic view, and its purpose is to illustrate material flows and connections between processes. A more detailed description of the processes (pyrolysis in the pyrolyzer, gasification in the gasifier, and combustion in the boiler) will be given further below.

In the apparatus, the pyrolysis process will take place in a pyrolyzer 1, which is supplied with fuel to be pyrolyzed, via an inlet (arrow F). The fuel can be solid fuel in the form of particles. It is possible to use wood-based material, such as wood chips, sawdust, bark, straw, various logging waste (forestry residues), or wood construction waste, or agricultural waste, which include straw, stalks, other plant parts, for example seeds and fruit shell waste, waste from the processing of root plants, all kinds of pressing waste and the like, or any organic waste in general. It is also possible to use semi-bio-based fuels, such as peat. For example oil shale or oil sand can also be used as fuel. When the material to be pyrolyzed is called fuel, it is important to keep in mind that the material does not burn in the pyrolysis process but emits combustible gaseous substances which, after condensation into liquid, can be recovered, stored, transported and burnt elsewhere in order to utilize their energy content. From the fuel to be pyrolyzed, pyrolysis residue, namely residual carbon i.e. coke, is left, which is still combustible and which can be utilized as will be described further below.

Solid fluidized bed material consisting of particles is supplied along a channel 3a to the pyrolyzer. The fluidized bed material can be, for example, inert inorganic material in the form of particles, such as sand. Fluidizing gas is supplied along a duct 4 to the pyrolyzer 1, whereby a fluidized bed, in which the bed material and the fuel are mixed, is formed in the pyrolyzer. Gaseous substances produced by the pyrolysis and entrained in the fluidizing gas are discharged from the pyrolyzer 1 along a duct 5. The fluidized bed material passed through the pyrolysis process and containing the carbonization residue which is in the form of solids and is still combustible, is taken from the pyrolyzer via a duct 3b. In practice, the pyrolyzer 1 can be equipped with a separator, for example a cyclone separator, in which the solid bed material and the pyrolysis residue are separated into the duct 3a from the gas flow which is conveyed further to a duct 5.

Along the duct 5, the gaseous substances enter a condenser 6, in which condensable gases are condensed to pyrolysis oil in a single step or separate steps. Further, non-condensable gases entrained in the condensable gases are taken from the condenser 6 further along a duct 7 to later processing, which will be described below.

The pyrolysis process is continuous; that is, products (pyrolysis oil, non-condensable gases and pyrolysis residue) are formed concurrently with the supply of fuel to the process. In the process, the energy content of the hot bed material continuously introduced via the duct 3a is utilized when the solid fuel supplied to the pyrolyzer is mixed with the bed material. The pyrolysis temperature (the temperature at which the pyrolysis of the fuel takes place) attained in this way can be about 400 to 800° C. The pyrolysis temperature may vary in different parts of the pyrolyzer.

A suitable inert gas, such as nitrogen, is used as the fluidizing gas. The fluidizing gas has to be substantially oxygen-free, so that it is also possible to use various process gases, from which the oxygen has been removed by burning. Fluidizing gas is dried waterless, if necessary, before it is supplied to the pyrolyzer. As the fluidizing gas, it is particularly possible to use recirculated non-condensable gases (broken line 7a).

The temperature required for the pyrolysis reaction can thus be attained with hot fluidized bed material introduced via the duct 3a and releasing heat to the process. The process is so-called flash pyrolysis, in which the raw material is heated fast to a high temperature for a short time under oxygen-free conditions, wherein gaseous products (pyrolysis oil which can be condensed into liquid, and non-condensable gases) as well as solid carbon residue are formed. The pyrolysis oil also contains water, depending on the moisture of the raw material.

The pyrolyzer 1 can operate on any principle that enables the pyrolysis of the fuel by means of heat from the hot fluidized bed material. As the pyrolyzer, it is possible to use, for example, a vertical reactor in which the fuel to be pyrolyzed and the hot bed material are introduced from below and they rise with the fluidizing gas to the top of the reactor, from which the pyrolysis products are removed. Similarly, it is possible to use so-called cross-flow, in which the fuel to be pyrolyzed and the bed material continuously pass in the horizontal direction through the pyrolyzer, and fluidizing air is blown from the bottom of the pyrolyzer up, transversely to the advancing direction of the fuel and the bed material. The bed material and the fuel are introduced to the initial end of the pyrolyzer, and fuel inlets can also be several in number in the flowing direction of the fuel and the bed material. The gases produced by pyrolysis and entrained in the fluidizing gas are taken into the duct 5 from above the fluidized bed, and the bed material and the carbonization residue are taken into the duct 3b from the terminal end of the pyrolyzer. Said arrangement is known from patents FI 122778 and FI 122858 as well as corresponding publications including U.S. Pat. No. 8,287,697 and US 2009/242376.

The pyrolysis temperature in the pyrolyzer 1 can be adjusted, for example, by adjusting the temperature of the hot bed material. This can be done by a heat exchanger placed upstream of the pyrolyzer or downstream of the inlet of bed material in the pyrolyzer, for heating or cooling the bed material with the heat exchanger.

The fluidized bed material which has released its heat will pass with the pyrolysis residue along the duct 3b to the gasifier 2, in which the pyrolysis residue is gasified for producing product gas. The gasification reaction produces heat which is transferred to the fluidized bed material which is returned along the duct 3a to the pyrolyzer 1. Consequently, there is a bed material circulation 3 between the pyrolyzer 1 and the gasifier 2. Along the duct 3b, the pyrolysis residue (carbonization residue) is removed along with the cooled bed material, and the heat of the bed material is regenerated by means of the energy content of the combustible pyrolysis residue. In the gasification, part of the energy content is transferred as heat to the bed material, and part will leave with the product gas produced in the gasification and will be utilized later.

Consequently, carbonaceous pyrolysis residue entering with the bed material is used as raw material for the gasification process in the gasifier 2. The gasification is performed by introducing oxygen-containing gas, such as air, along a duct 8 to the gasifier, to cause partial combustion of the pyrolysis residue; in other words, substoichiometric air quantity is used. In relation to the pyrolysis residue, the quantity of gas introduced can correspond to 20 to 50% of stoichiometrically complete combustion. The temperature may vary at different locations of the gasifier, but in the gasification step, it is higher than in the pyrolysis, so that it can be used for heating the bed material, preferably in the range of 600 to 1200° C. Product gas is removed from the gasifier 2 along a duct 9 further to combustion. The product gas contains hydrogen, carbon monoxide, carbon dioxide, and steam. The product gas can also contain small amounts of methane. Because the material to be gasified (the pyrolysis residue or the carbonization residue) is almost absolutely dry, thanks to the preceding pyrolysis process, thermal energy generated by the gasification process is not consumed in evaporation of water, and it can be used for heating the inert fluidized bed material circulating through the gasifier. The temperature of the gasifier can be adjusted by the air coefficient (the relative amount of oxygen). Compared with the gasification of biomass, the drying and pyrolysis steps are eliminated in the gasification, and for example no tar is produced which should be separated from the product gas.

The inlets of the fuel and the oxygen-containing gasification gas in the gasifier 2 are shown schematically. The actual inlets depend on the gasification process and the structural implementations of the gasifier and the pyrolyzer.

The gasifier 2 is preferably a fluidized bed gasifier. In fluidized bed gasification, a mixture of fluidized bed material and pyrolysis residue, as well as gasification gas which simultaneously constitutes the fluidizing gas, are introduced in the bottom of the gasifier, and these are used to form a circulating fluidized bed in which gasification takes place. As the fluidizing gas, it is possible to use air, steam, or oxygen, or a mixture of these. Product gases are separated from the bed material at the top of the gasifier, for example by means of a cyclone, and heated bed material is conveyed to the duct 3a and thereby to the pyrolyzer. Consequently, the process is circulating fluidized bed gasification (CFBG), in which the bed material now circulates via the pyrolyzer 1 back to the gasification.

In the figure, the bed material circulation 3 is shown in a schematic view, and it is intended to cover all apparatus embodiments. When the pyrolyzer 1 is a vertical reactor, the mixture of fluidized bed material and pyrolysis residue is guided from the top of the reactor to the bottom of the fluidized bed gasifier 2, whereas the heated fluidized bed material, separated from the product gas at the top of the fluidized bed gasifier 2, is conveyed back to the bottom of the pyrolyzer 1. This bed material circulation is shown schematically in FIG. 2.

Consequently, the process can take place by the fluidized bed principle in both the pyrolyzer 1 and the gasifier 2. The pyrolyzer and the gasifier can operate on the principle of circulating fluidized bed (CFB), but they can also operate on the principle of bubbling fluidized bed (BFB). Similarly, one of said reactors can operate on the principle of circulating fluidized bed, and the other on the principle of bubbling fluidized bed. In all cases, taking the bed material and the pyrolysis residue from the pyrolyzer 1 and conveying them to the gasifier 2, and taking the bed material from the gasifier 2 and conveying it back to the pyrolyzer 1, can be arranged in such a way that the operation is continuous.

Combustible product gas obtained from the gasifier 2 is conveyed along the duct 9 to a boiler 10, in which it is burnt. When necessary, additional fuel (arrow 11) can be introduced in the gasification if the carbon residue from the pyrolyzer is not sufficient to meet the demands of product gas for the boiler. In addition, that part of non-condensable gases produced by the pyrolysis process, which is not circulated as fluidizing gas to the pyrolyzer, can be conveyed along the duct 7 to the same boiler 10. Alternatively, it can be conveyed to the gasifier 2. The boiler 10 is a gas boiler in which the fuels to be burnt are in a gaseous state and they are burnt in a burner 10a. Moreover, the non-condensable gases are used as good auxiliary fuel, thanks to their higher calorific value. Combustion air is introduced along a duct 10b to the burner. The boiler 10 is equipped with a thermal circuit for receiving the energy produced by combustion. The gas boiler can be a boiler equipped with a steam circuit, a hot water boiler, or a warm water boiler, generally any power boiler intended for producing energy in the form of heat or heat and electricity. For example, an existing boiler can be retrofitted for the process by supplementing it with a suitable burner.

The product gas can be processed after the gasification, before it is conveyed to the boiler 10. The duct 9 is equipped with, for example, a hot gas filter 12 for separating ash from the product gas. It is also possible to separate carbon dioxide from the product gas.

The boiler 10 can also be used for burning other fuel in addition to the gaseous substances produced by the pyrolysis process and the gasification process. The boiler can be configured to burn both solid fuel and gaseous fuel simultaneously.

It is possible that product gas from the gasifier is also introduced simultaneously in several boilers each equipped with a burner. Non-condensable gases can also be supplied to these boilers.

Figure 2:
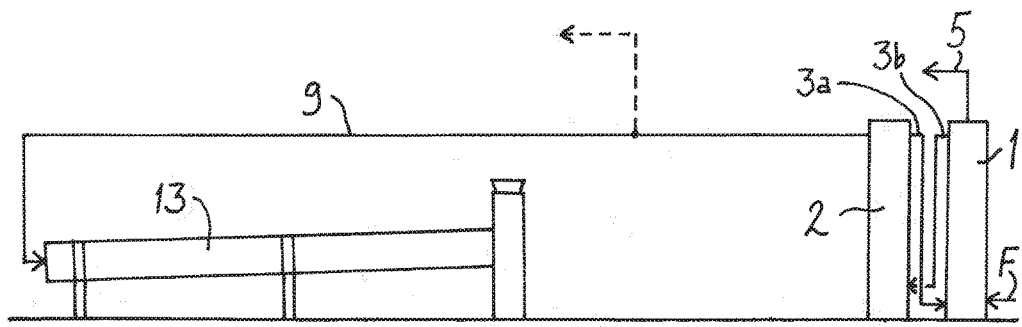
FIG. 2 is a schematic view of another alternative for using product gas, with respect to FIG. 1.

Other targets in which product gas from gasification, possibly in combination with non-condensable gases, can be burnt for producing energy, include various kilns in which thermal energy from combustion is utilized for the processing of materials. Examples of these include cement kilns and lime mud reburning kilns. FIG. 2 shows an alternative, in which the product gas line 9 from the gasifier is led to a burner located at the end of a lime mud reburning kiln 13, in which it is burnt. A broken line illustrates an alternative, in which product gas is also conveyed to another target, such as a boiler. It is thus possible to distribute the same product gas to different types of targets, for example to a boiler and a kiln, simultaneously.

The energy content of the fuel F to be entered in the process can be distributed to products obtained as follows: bio oil (pyrolysis oil) 40 to 65%, product gas from gasification 10 to 35%, non-condensable gases 10 to 25%.

The invention is not restricted to the process and the apparatus presented above, but it may vary within the scope of the claims. The types of pyrolyzer and gasifier are not limited to those presented above; similarly, it is possible to use other structural embodiments than those presented above as the boilers and kilns for burning the product gas.

The invention claimed is:

1. A method for performing pyrolysis, comprising:
   supplying solid fuel in the form of particles to a pyrolyzer;
   maintaining pyrolysis conditions in the pyrolyzer in order to separate condensable gaseous substances from the solid fuel;
   supplying heat required by the pyrolysis conditions at least partly with solid fluidized bed material which passes through the pyrolyzer simultaneously as the solid fluidized bed material is fluidized in the pyrolyzer by fluidizing gas;
   under said pyrolysis conditions, separating condensable gaseous substances from the solid fuel;
   conveying said condensable gaseous substances from the pyrolyzer to a condenser; in the condenser, separating said condensable gaseous substances as pyrolysis oil in liquid state;
   taking the solid fluidized bed material containing combustible pyrolysis residue from the solid fuel from the pyrolyzer;
   circulating said solid fluidized bed material containing the combustible pyrolysis residue from the solid fuel through a gasifier gasification process;
   in the gasifier gasification process, performing a gasification process by introducing oxygen-containing gas to cause partial combustion of the combustible pyrolysis residue thereby forming product gas from the combustible pyrolysis residue and utilizing the energy content of the combustible pyrolysis residue in heating of the fluidized bed material by transferring heat produced by the gasification process to the fluidized bed material to form heated fluidized bed material,
   returning the heated fluidized bed material from the gasifier gasification process to the pyrolyzer;
   burning the product gas formed from the combustible pyrolysis residue in a kiln in which thermal energy from combustion is utilized for the processing of materials; and
   adjusting a pyrolysis temperature in the pyrolyzer by adjusting a temperature of the solid fluidized bed material by a heat exchanger, wherein the solid fluidized bed material is sand.

2. The method according to claim 1, wherein condensable gaseous substances and non-condensable combustible gases are separated from the solid fuel and the condensable gaseous substances produced in the pyrolyzer are separated from the non-condensable combustible gases; the method and further comprising:
   burning at least part of the non-condensable combustible gases produced in the pyrolyzer with the product gas.

3. The method according to claim 1, wherein the solid fuel is solid bio-based or semi-bio-based fuel.

4. The method according to claim 1, wherein the pyrolysis conditions comprise a temperature of 400 to 800° C., and the gasification process comprises a temperature of 600 to 1200° C., the temperature of the gasification process being higher than the temperature of the pyrolysis conditions.

* * * * *